(12) United States Patent  (10) Patent No.: US 9,055,052 B2
Mane et al.  (45) Date of Patent: *Jun. 9, 2015

(54) METHOD AND SYSTEM FOR IMPROVING STORAGE SECURITY IN A CLOUD COMPUTING ENVIRONMENT

(71) Applicant: NETAPP, INC., Sunnyvale, CA (US)

(72) Inventors: Nandkumar Lalasaheb Mane, Bangalore (IN); Rajashekhar Mallikarjun Arasanal, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/091,117

(22) Filed: Nov. 26, 2013

(65) Prior Publication Data

US 2014/0130128 A1    May 8, 2014

Related U.S. Application Data

(63) Continuation of application No. 12/951,089, filed on Nov. 22, 2010, now Pat. No. 8,601,265.

(51) Int. Cl.
*H04L 29/06* (2006.01)
*G06F 21/57* (2013.01)
*H04L 9/32* (2006.01)

(52) U.S. Cl.
CPC .............. *H04L 63/08* (2013.01); *G06F 21/57* (2013.01); *G06F 2221/2111* (2013.01); *H04L 9/3234* (2013.01); *H04L 63/0869* (2013.01); *H04L 2209/127* (2013.01); *H04L 9/3247* (2013.01)

(58) Field of Classification Search
CPC ... H04L 63/08; H04L 9/3247; H04L 63/0869; H04L 63/0853; H04L 2209/127; G06Q 30/04; G06F 21/57; G06F 2221/2111; G06F 21/30
See application file for complete search history.

(56) References Cited

U.S. PATENT DOCUMENTS

| 8,271,974 | B2 * | 9/2012 | Mazhar et al. | 717/177 |
| 2006/0015500 | A1 | 1/2006 | Heiden | |
| 2006/0017919 | A1 * | 1/2006 | Holz et al. | 356/301 |
| 2006/0025500 | A1 * | 2/2006 | Rumer et al. | 523/200 |
| 2007/0067620 | A1 * | 3/2007 | Jevans | 713/156 |
| 2007/0239990 | A1 * | 10/2007 | Fruhauf et al. | 713/185 |
| 2009/0049222 | A1 * | 2/2009 | Lee et al. | 710/300 |
| 2010/0037296 | A1 * | 2/2010 | Silverstone | 726/3 |
| 2010/0333116 | A1 | 12/2010 | Prahlad et al. | |
| 2011/0055161 | A1 * | 3/2011 | Wolfe | 707/652 |
| 2011/0167469 | A1 * | 7/2011 | Letca et al. | 726/1 |
| 2011/0243553 | A1 | 10/2011 | Russell | |
| 2012/0167197 | A1 | 6/2012 | Kruger et al. | |

* cited by examiner

*Primary Examiner* — Ario Etienne
*Assistant Examiner* — Kidest Mendaye
(74) *Attorney, Agent, or Firm* — Klein, O'Neill & Singh, LLP

(57) ABSTRACT

A method of improving storage security in a cloud environment includes interfacing a secure microcontroller with a storage controller associated with a client device in the cloud environment to authenticate a platform associated with the storage controller and registering the storage controller with an authentication server configured to be set up in the cloud environment. The method also includes authenticating the storage controller based on a communication protocol between the client device, the authentication server and the storage controller, and obtaining, at the client device, a signature data of the storage controller following the authentication thereof. The signature data is configured to be stored in the secure microcontroller interfaced with the storage controller.

26 Claims, 10 Drawing Sheets

METHOD AND SYSTEM FOR IMPROVING STORAGE SECURITY IN A CLOUD COMPUTING ENVIRONMENT

CROSS-REFERENCE TO RELATED APPLICATION

This patent application claims priority of and is a continuation of U.S. patent application Ser. No. 12/951,089 filed on Nov. 22, 2010, and now U.S. Pat. No. 8,601,265, the disclosure of which is incorporated herein by reference in its entirety.

FIELD OF TECHNOLOGY

This disclosure relates generally to cloud computing and, more particularly, to a method, an apparatus, and/or a system of improving storage security in a cloud computing environment.

BACKGROUND

In a cloud computing environment, storage requirements of one or more client device(s) may be met through a corresponding one or more storage controller(s) configured to host one or more virtual server(s) appropriately provisioned thereto. A cloud administrator may have the requisite privileges to configure a virtual server associated with a client device on any storage controller. Also, for example, the cloud administrator may accidentally or maliciously run destructive commands configured to compromise the security of data associated with the client device. An unauthorized outsider/user may also break into the system and perform the aforementioned act of malice.

Tampering of the hardware and/or software associated with a storage controller may result in a customer of the cloud service operating at the client device experiencing a compromised quality of service. To address the aforementioned problems, a set of capabilities may be defined in a role and assigned to a customer of the cloud service. Although the role-based model may provide structure, the unauthorized outsider/user may still possess the requisite means to access data associated with the customer that resides on the storage controllers. The incapability of the customer to remotely verify the integrity and the confidentiality of cloud resources (e.g., storage controller(s)) configured to process and/or store data associated therewith may imply that the customer possesses no means to ensure the integrity and the confidentiality of his/her data and the computation associated therewith.

SUMMARY

Disclosed are a method, an apparatus, and/or a system of improving storage security in a cloud computing environment.

In one aspect, a method of improving storage security in a cloud environment includes interfacing a secure microcontroller with a storage controller associated with a client device in the cloud environment to authenticate a platform associated with the storage controller and registering the storage controller with an authentication server configured to be set up in the cloud environment. The method also includes authenticating the storage controller based on a communication protocol between the client device, the authentication server and the storage controller, and obtaining, at the client device, a signature data of the storage controller following the authentication thereof. The signature data is configured to be stored in the secure microcontroller interfaced with the storage controller.

In another aspect, a method of verifying integrity of a storage controller associated with a client device in a cloud environment includes configuring the storage controller with information associated with an authentication server set up in the cloud environment. The information is associated with a signature data of the authentication server. The method also includes configuring the authentication server with a signature data associated with the storage controller, registering the storage controller with the authentication server to establish a trusted key pair therebetween, and attesting the storage controller through the authentication server based on the established trusted key pair. Further, the method includes obtaining, at the client device, the signature data of the storage controller following the attestation thereof.

In yet another aspect, a cloud environment with improved storage security includes a client device, a cloud manager configured to provision storage associated with the client device, and a storage controller associated with the client device. The storage controller includes a secure microcontroller interfaced therewith to authenticate a platform associated therewith. The cloud environment also includes an authentication server configured to register the storage controller and to authenticate the storage controller based on a communication protocol between the client device, the storage controller and the authentication server.

The client device is automatically configured to obtain a signature data of the storage controller following the authentication thereof and/or is configured to obtain the signature data of the storage controller following the authentication thereof upon querying the storage controller. The secure microcontroller is configured to store the signature data of the storage controller therein.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to improve storage security in a cloud computing environment. Although the present embodiments have been described with reference to specific example embodiments, it will be evident that various modifications and changes may be made to these embodiments without departing from the broader spirit and scope of the various embodiments.

Figure 1:
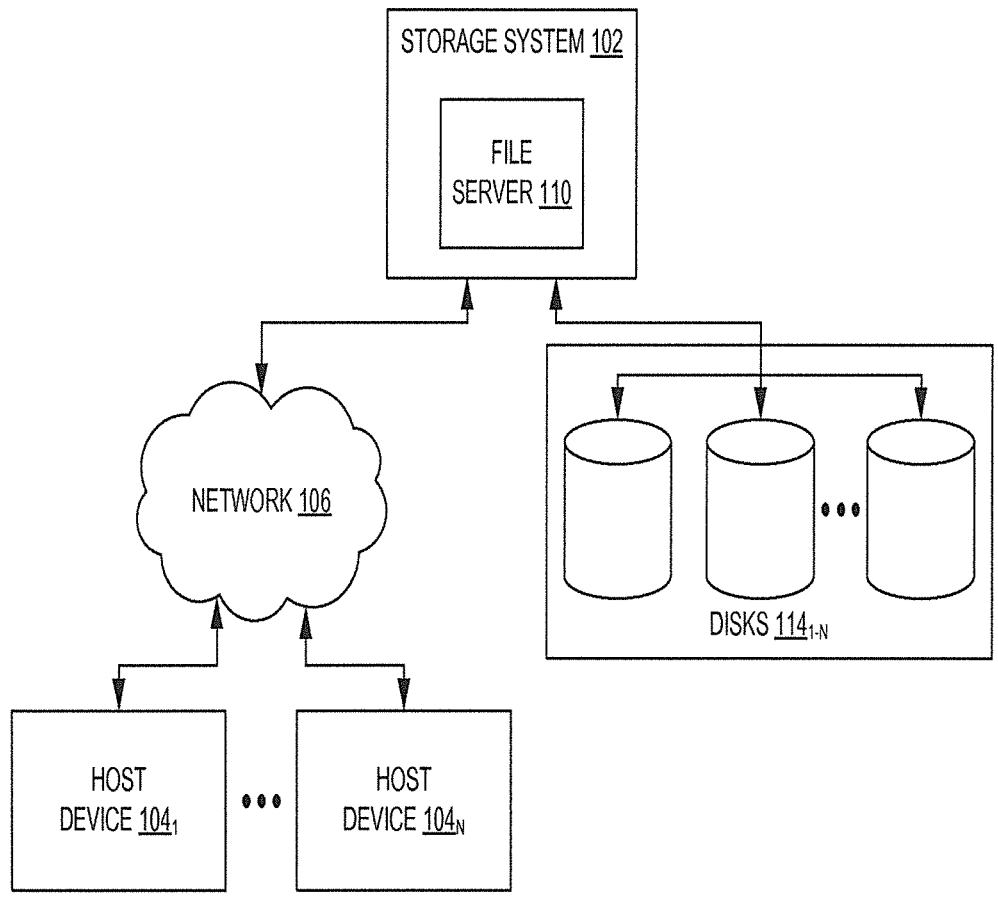
FIG. 1 is a schematic view of a storage system interfaced with a number of host devices through a network, according to one or more embodiments.

FIG. 1 shows a storage system 102 interfaced with a number of host devices $104_{1-N}$ through a network 106, according to one or more embodiments. In one or more embodiments, host devices $104_{1-N}$ may be general-purpose computing devices configured to execute applications. In one or more embodiments, network 106 may be a storage area network (SAN), a local area network (LAN), a wide area network (WAN), a virtual private network (VPN) using communication links over, for example, the Internet, or any combination thereof. In one or more embodiments, storage system 102 may directly communicate with host devices $104_{1-N}$ as a Network Attached Storage (NAS) device or a Direct Attached Storage (DAS) device. In one or more embodiments, storage system 102 may operate in a hybrid SAN-NAS environment. For example, storage system 102 may offer file-serving capabilities, and may also serve data blocks over a Fiber Channel SAN.

In one or more embodiments, host devices $104_{1-N}$ may indicate customers of services provided through network 106 or users/departments associated with an organization (e.g., an Information Technology (IT) organization). In one or more embodiments, each host device $104_{1-N}$ may have storage associated therewith. For the aforementioned purpose, in one or more embodiments, isolated logical virtual storage partitions (not shown) may be created on storage system 102 through an operating system (e.g., NetApp®'s Data ONTAP® operating system) associated therewith. In one or more embodiments, therefore, each virtual storage partition may be associated with a host device $104_{1-N}$. In one or more embodiments, information on a secured virtual storage partition may solely be accessed by the host device associated therewith.

In one or more embodiments, storage system 102 may include a storage server (e.g., file server 110) and may be associated with a set of mass storage devices (e.g., disks $114_{1-N}$). In one or more embodiments, file server 110 may be configured to receive read/write requests from host devices $104_{1-N}$ and to respond appropriately. In one or more embodiments, the requests may be directed to data stored in/to be stored in disks $114_{1-N}$. Disks $114_{1-N}$ may be, for example, conventional magnetic disks, optical disks such as compact disks-read only memory (CD-ROM) or digital versatile/video disks (DVD) based storage, magneto-optical (MO) storage, or any other type of non-volatile storage devices suitable for storing large quantities of data. In one or more embodiments, file server 110 may be construed as the "manager" of storage system 102. In one or more embodiments, a main purpose of file server 110 may be to provide a location or location(s) for shared disk access (e.g., shared storage of computer data) configured to be accessed by host devices $104_{1-N}$.

In one or more embodiments, the operating system associated with storage system 102 may support data sets associated with protocols including but not limited to Network File System (NFS) protocol, Common Internet File System (CIFS) protocol, Internet Small Computer System Interface (iSCSI) protocol, Hypertext Transfer (HTTP) protocol, File Transfer Protocol (FTP), FTP-Secure (FTPS) protocol, Secure File Transfer Protocol (SFTP), and Network Data Management Protocol (NDMP). In one or more embodiments, a host device $104_{1-N}$ may be configured to interact with storage system 102 according to a client/server model of information delivery. For example, host device $104_{1-N}$ may request the services of storage system 102, and storage system 102 may return the results (e.g., through packets) through network 106.

Figure 2:
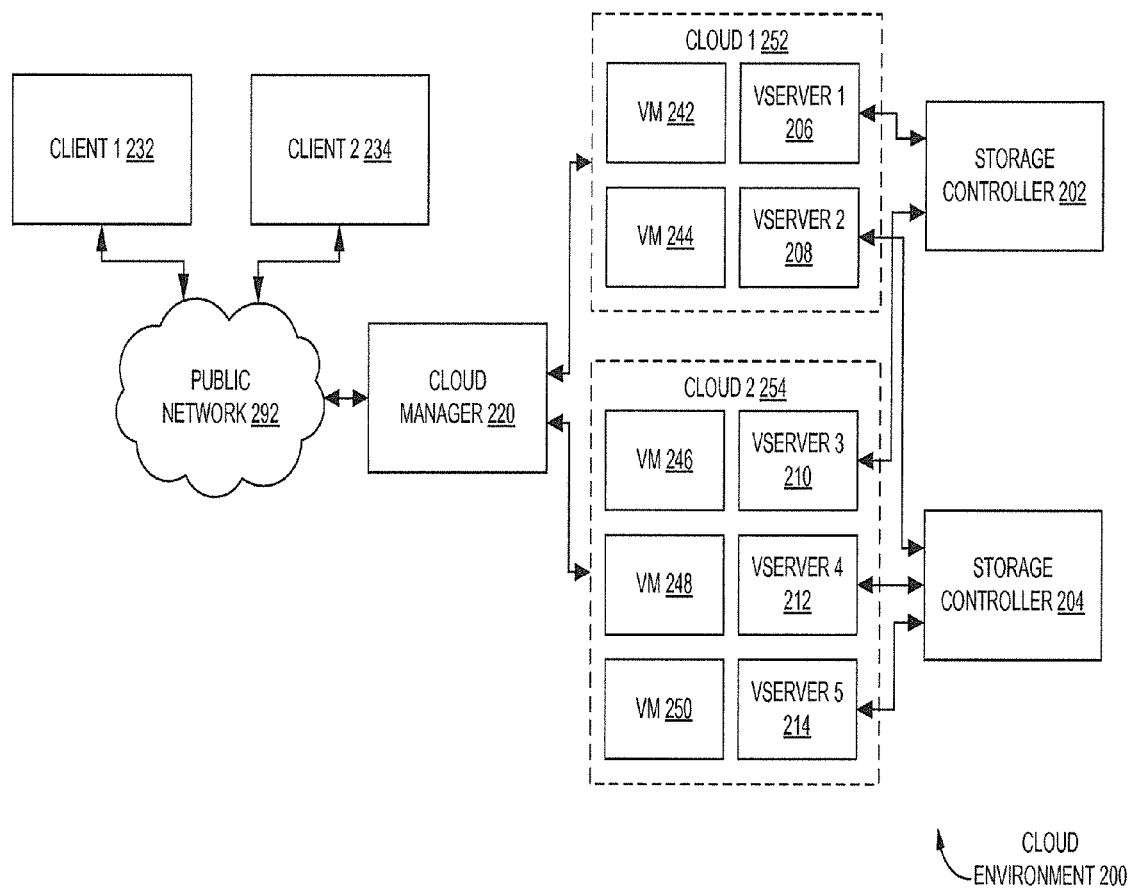
FIG. 2 is a schematic view of one or more storage controllers in a cloud environment, according to one or more embodiments.

FIG. 2 shows one or more storage controllers in a cloud environment 200 including one or more storage system(s) analogous to storage system 102, according to one or more embodiments. In one or more embodiments, cloud environment 200 may be a computing environment configured to enable network access (e.g., on-demand) to a shared pool of configurable computing resources (e.g., networks, storage, host servers, applications, services). In one or more embodiments, a storage controller may be a hardware configured to host one or more virtual servers (vservers) in cloud environment 200. In the example embodiment discussed with regard to FIG. 2, storage controller 202 may be configured to be associated with vserver 1 206 and vserver 3 210. Cloud environment 200 may include another storage controller, viz., storage controller 204, configured to be associated with vserver 2 208, vserver 4 212 and vserver 5 214. Storage controller 202 and storage controller 204 may be deployed by a cloud manager 220 and/or a cloud administrator configured to provision the host systems, storage associated with one or more client devices (e.g., client 1 232, client 2 234) and/or services requested by the one or more client devices.

In one or more embodiments, cloud manager 220 may enable the one or more client devices to self-provision computing resources thereof. In one or more embodiments, cloud manager 220 may manage cloud portion(s) (e.g., cloud 1 252, cloud 2 254) associated with client 1 232 and client 2 234. Client 1 232 and/or client 2 234 may log into a console associated with cloud manager 220 to access cloud 1 252 and/or cloud 2 254 (and virtual machines (VMs) therein) through a public network 292 (e.g., Internet). The client devices and/or VMs (as discussed below) associated therewith provided in cloud environment 200 may be analogous to host devices 104$_{1-N}$ of FIG. 1. The VMs, for example, may run applications/application programs associated with the client devices. As a VM may be a software implementation of a "physical machine," the VM may share physical resources with one or more VM(s).

In order to address storage requirements/requests associated with client 1 232 and client 2 234, cloud manager 220 may be configured to appropriately provision vserver 1 206, vserver 2 208, vserver 3 210, vserver 4 212 and vserver 5 214 and allocate to client 1 232 and client 2 234. The aforementioned vservers may be virtualized entities utilized by client 1 232 and client 2 234 to meet storage requirements thereof. Multi-tenancy may allow for a storage controller to have multiple vservers (e.g., vserver 1 206 and vserver 3 210 associated with storage controller 202, and vserver 2 208, vserver 4 212 and vserver 5 214 associated with storage controller 204) associated therewith. A portion of the cloud (e.g., cloud 1 252) including vserver 1 206, vserver 2 208 and virtual machines (VMs; e.g., VM 242, VM 244) associated therewith may be associated with client 1 232 and a portion of the cloud (e.g., cloud 2 254) including vserver 3 210, vserver 4 212 and vserver 5 214 and VMs (e.g., VM 246, VM 248, VM 250) associated therewith may be associated with client 2 234. In one or more embodiments, VMs may reside on storage exposed by vserver(s). It is obvious that physical machines may be associated with the clients (e.g., client 1 232, client 2 234) instead of VMs.

The aforementioned cloud portions may be logical subsets of the cloud and may include VMs implemented with operating systems (e.g., Linux, Microsoft®'s Windows®). "Cloud" as used herein may refer to the large pool of configurable computing resources (e.g., virtualized computing resources) that may be subjected to a pay-per-use model, in which client(s) may enter into service agreement(s) with service provider(s). The portion of the "cloud," therefore, may refer to the pool of resources associated with a particular client. It is obvious that client 1 232 and/or client 2 234 may be entities (e.g., corporations), and that there may be a number of host devices associated with each of client 1 232 and/or client 2 234.

Cloud 1 252 and/or cloud 2 254 may span across several geographic regions. In one or more embodiments, the aforementioned cloud portions may span multiple countries under differing jurisdictional guidelines. For example, a jurisdictional guideline may deem that a vserver needs to be launched on hardware (e.g., storage controller) located in the same jurisdiction as the corresponding client(s). In one or more embodiments, administrators of cloud environment 100 may possess the authority to launch one or more vservers on any of storage controller 202 and storage controller 204, irrespective of the location(s) thereof. Further, in one or more embodiments, the aforementioned one or more vservers may be associated with one or more versions of a storage operating system (e.g., NetApp®'s Data ONTAP® operating system).

For example, an administrator may modify the version of the storage operating system and/or configuration settings on storage controller 202 and/or storage controller 204. In another example, an administrator may provision a vserver on a storage controller offering lower performance and/or located in a geographic region different from that of a client device.

Figure 3:
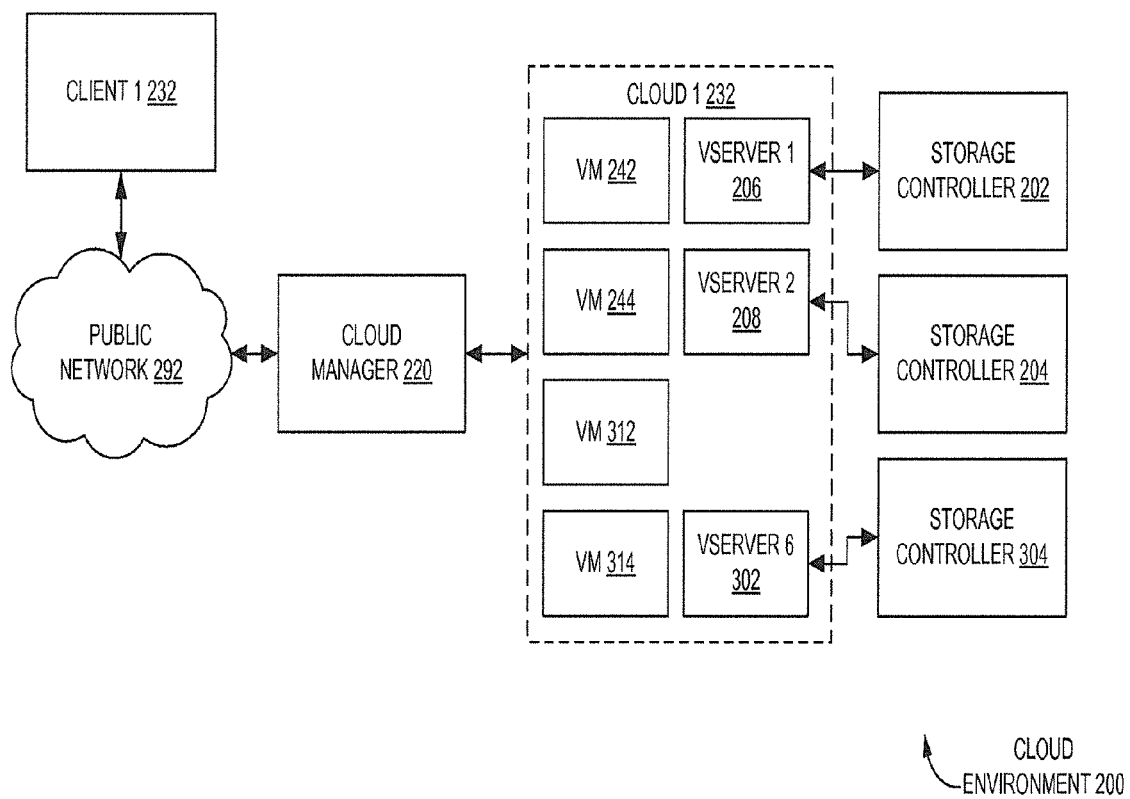
FIG. 3 is a schematic view of a virtual server in a cloud environment configured on a low-performance storage controller located in a geographic region different from that of a client device associated therewith, according to one or more embodiments.

FIG. 3 shows a vserver 6 302 configured on a low-performance storage controller 304 located in a geographic region different from that of client 1 232, according to one or more embodiments. In the example embodiment shown in FIG. 3, cloud 1 252 may include vserver 6 302 and additional VMs, viz., VM 312 and VM 314. Now, as storage controller 304 is a low-performance storage controller, storage controller 304 may not withstand a load as per a service agreement between a client (e.g., client 1 232, client 2 234) and a cloud service provider. Therefore, a denial-of-service may result therefrom. Secondly, as storage controller 304 is not in the same geographic location as client 1 232, client 1 232 may not be able to enforce jurisdictional guidelines on the cloud service provider. The aforementioned consequences merely serve as examples.

Other threats arising from the "unsecure" state of cloud environment 200 may include an administrator configuring storage through a storage controller having a tampered version of a storage operating system associated therewith and/or a tampered version of a Basic Input/Output System (BIOS) associated therewith and/or a storage controller having compromised security settings. For example, the administrator may perform configuration changes to vserver 1 206 so that client 2 234 may also access vserver 1 206. Client 1 232 may not be aware of the "unsecure" state of cloud environment 200, the "unsecure" state being caused due to at least the abovemenioned reasons.

In one or more embodiments, incorporating a secure microcontroller (e.g., a Trusted Platform Module (TPM) chip) on storage controller(s) associated with the one or more client device(s) and a set of authentication protocols may enable a client device (e.g., a cloud customer) to verify the authenticity of the storage controller(s) owned by the cloud service provider. In one or more embodiments, the secure microcontroller may be configured to store authentication and/or attestation data associated with the storage controller(s), as will be discussed below. In one or more embodiments, the aforementioned data may include passwords, certificates and/or encryption keys. In one or more embodiments, the secure microcontroller may be utilized to ensure the trustworthiness of the platform associated with the storage controller through storing and comparing a platform measurement list. In one or more embodiments, the platform measurement list may be a sequence of signatures (e.g., hashes) of the set of instructions involved in the boot sequence, viz., the BIOS, the boot-loader and/or the software implementing the platform. In one or more embodiments, the secure microcontroller may utilize an RSA algorithm, a Secure Hash Algorithm (SHA; e.g., SHA-1) and/or a Hash-based Method Authentication Code (HMAC) algorithm for cryptography purposes.

In one or more embodiments, the secure microcontroller may not be able to control the set of instructions (e.g., software) executing on the storage controller(s). Although the secure microcontroller may be configured to store pre-runtime configuration parameters associated with the storage controller(s), policies associated with the aforementioned parameters may be determined and implemented through other applications. In one or more embodiments, the secure microcontroller may expose standard Application Programming Interfaces (APIs) configured to be utilized by an application to interact therewith.

In one or more embodiments, interfacing the secure microcontroller with the storage controller(s) may be accomplished through a permanent soldering of the motherboard associated with the storage controller hardware. In one or more embodiments, thus, a one-on-one mapping between the secure microcontroller and the platform interfaced therewith may be provided. In one or more embodiments, data bound to a particular platform may solely be accessible to that platform. In one or more embodiments, if the data is configured to migrate to a different platform and/or if the binding conditions associated with the particular platform are not met, the data may not be accessible. In an example embodiment, when the secure microcontroller is utilized for platform attestation, a software stack associated therewith may be configured to calculate information about the platform and/or to store a measurement list associated with the storage controller in a configuration register available within the secure microcontroller.

"Signature data" may be a broad term encompassing "measurement list." Although "measurement list" is used frequently below, "measurement list" may be construed to indicate "signature data." For example, "measurement list" of a storage controller is an example of "signature data" associated with the storage controller.

Thus, in one or more embodiments, the secure microcontroller may be utilized on the storage controller(s) for platform authentication purposes. In one or more embodiments, the storage controller(s) may need to be capable of responding to requests from the client device(s) associated with authentication of the hardware. For example, the client (e.g., a customer) may want to verify specific information associated with the appropriate storage controller(s) including but not limited to the BIOS version, the storage operating system version, the configuration information and hardware identification information to ensure that data served thereto is as per the agreement with the cloud service provider.

In one or more embodiments, to enable attestation of the one or more storage controller(s) through the one or more client device(s), the one or more storage controller(s) configured to serve the one or more client device(s) may need to undergo a registration process with an authentication server configured to be set up in the cloud jointly by a client and a cloud service provider based on an agreement. In one or more embodiments, the authentication server may be based on any operating system (e.g., Microsoft®'s Windo Linux), and may also include a secure microcontroller. In one or more embodiments, as agreed by the client and the cloud service provider, only authorized persons may be allowed to access the authentication server. For example, A may be the cloud service provider and B may maintain the authentication server. The authentication server maintained by third-party B may be accessible both from the services side (A) and from the customer side (e.g., client).

Figure 4:
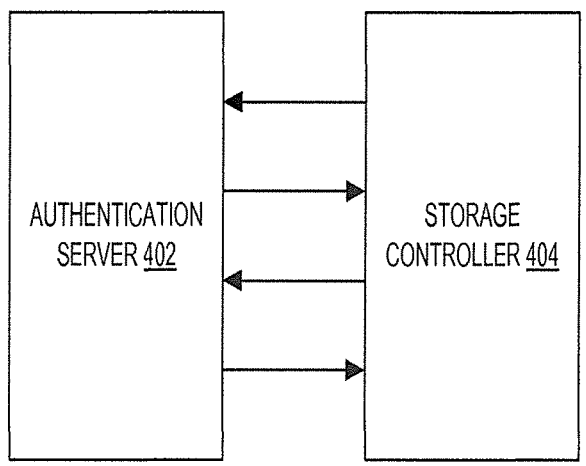
FIG. 4 is an illustrative view of the exchange of messages between an authentication server and a storage controller during the registration process of the storage controller, according to one or more embodiments.

In one or more embodiments, whenever a storage controller is added to the cloud associated with the client device (e.g., cloud 1 252 associated with client 1 232), an administrator may configure the storage controller with authentication information including an encrypted measurement list associated with the authentication server. In one or more embodiments, an administrator of the authentication server may configure the authentication server with an encrypted measurement list associated with the storage controller. In one or more embodiments, the storage controller may then undergo a registration process with the authentication server. FIG. 4 shows the exchange of messages between authentication server 402 and a storage controller 404 (analogous to the storage controllers of FIG. 2 and FIG. 3) during the registration process, according to one or more embodiments. In one or more embodiments, storage controller 404 may include a secure microcontroller (not shown) associated therewith.

In one or more embodiments, the aforementioned registration process may establish a trusted key pair, as will be discussed below. In one example embodiment, the measurement lists associated with authentication server 402 and storage controller 404 may be compared in an analogous manner to, for example, checking of passwords during a login process associated with Linux. In one or more embodiments, once storage controller 404 is attested, authentication server 402 may be configured to add storage controller 404 to a list of trusted storage controller(s) and store the trusted key pair in a memory associated therewith. In one or more embodiments, the key pairs generated during the attestation may be temporary, and authentication server 402 or storage controller 404 may have to undergo the registration process again during a reboot thereof to establish a new key pair. In one or more embodiments, if the configuration, the software and/or other attributes associated with storage controller 404 changes, the registration process may fail and the client(s) may immediately be cognizant of the change in the cloud associated therewith.

In one or more embodiments, whenever a client (e.g., a user at a client device) wants to verify the authenticity of a storage controller, a series of messages may be exchanged between the client, authentication server 402 and storage controller 404. In one or more embodiments, the client may obtain the measurement list of storage controller 404, and may verify the measurement list. In one or more embodiments, upon verification of the measurement list of storage controller 404, the authenticity of storage controller 404 may, in turn, be verified.

In one or more embodiments, the registration process may be in the form of a protocol. In one or more embodiments, discussion of the registration protocol may be carried out with reference to FIG. 4. In one or more embodiments, the registration process may commence with storage controller 404 transmitting a challenge message to authentication server 402. The challenge message may include a random number or a pseudo-random number (e.g., nonce $n_{SC}$). In one or more embodiments, authentication server 402 may now generate a private key thereof, obtain a measurement list thereof, and encrypt the data with the private key generated, along with nonce $n_{SC}$. In one or more embodiments, also, authentication server 402 may transmit a challenge to storage controller 404 with an own random number or a pseudo-random number (e.g., nonce $n_{AS}$) encrypted using the generated private key.

In one or more embodiments, storage controller 404, while generating nonce $n_{SC}$, may have generated keys therefor. Therefore, in one or more embodiments, when authentication server 402 transmits the encrypted message thereof to storage controller 404, storage controller 404 may be configured to decrypt the message using a public part of the key(s) generated during generation of nonce $n_{SC}$ and to check whether nonce $n_{SC}$ matches with a number in the encrypted message transmitted thereto. In one or more embodiments, if there is a match, storage controller 404 may be configured to check the measurement list of authentication server 402 to authenticate authentication server 402.

Now, in one or more embodiments, if authentication server 402 is authenticated (after nonce $n_{SC}$ is matched), storage controller 404 may be configured to transmit the measurement list thereof with nonce $n_{AS}$ (received from authentication server 402) encrypted with the private key to authentication server 402. In one or more embodiments, authentication server 402 may be configured to decrypt the message from authentication server 402 using the public portion of the key(s) and to match a measurement list associated therewith in a database thereof. In one or more embodiments, again, authentication server 402 may be configured to match nonce $n_{AS}$ in the message received from storage controller 404. In one or more embodiments, if both result in matches, authentication server 402 may be configured to transmit a confirmation message indicating that storage controller 404 is "trusted."

Figure 5:
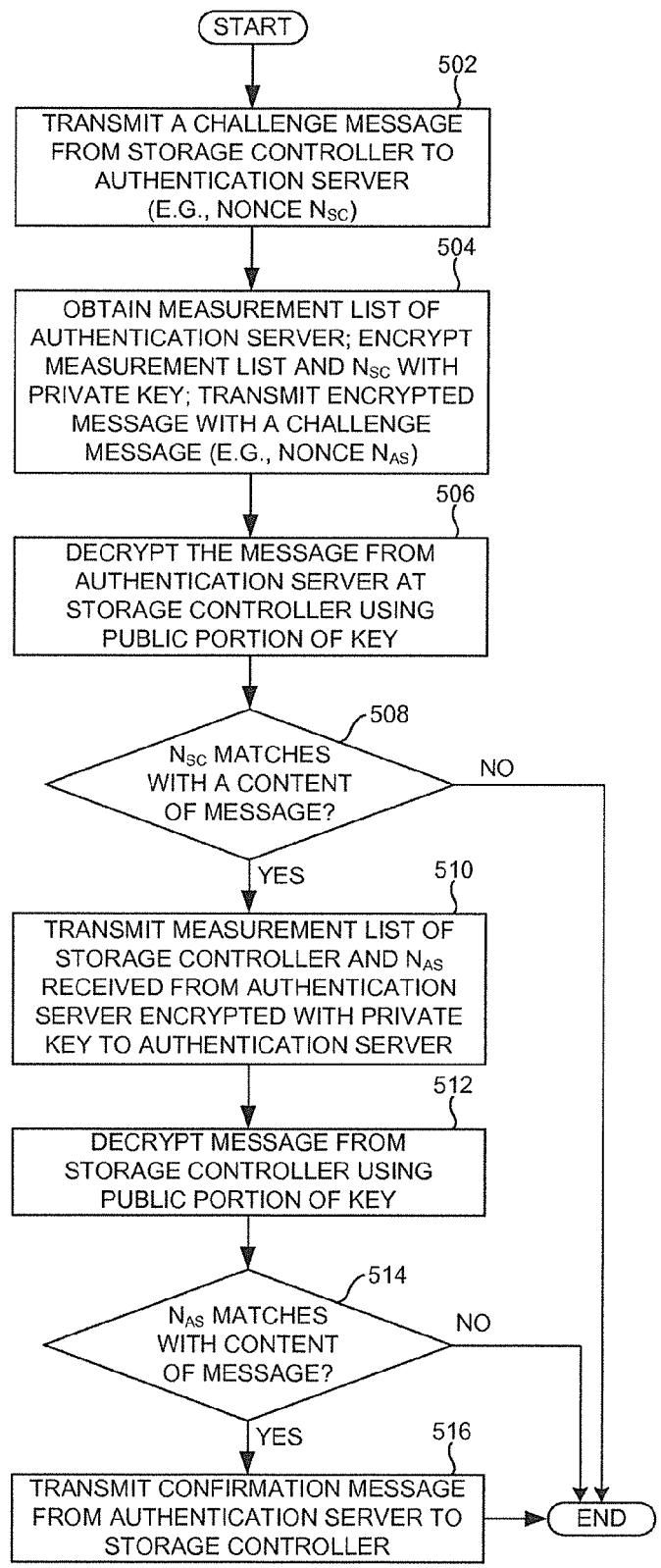
FIG. 5 is a flowchart detailing the operations involved in a process associated with registering the storage controller with the authentication server of FIG. 4, according to one or more embodiments.

FIG. 5 summarizes the aforementioned registration process, according to one or more embodiments. Specifically, FIG. 5 shows a flowchart detailing the operations involved in a process associated with registering storage controller 404 with authentication server 402. In one or more embodiments, operation 502 may involve transmitting a challenge message from storage controller 404 to authentication server 402. In one or more embodiments, the challenge message may include a nonce $n_{SC}$. In one or more embodiments, operation 504 may then involve obtaining the measurement list of authentication server 402, encrypting the aforementioned measurement list and nonce $n_{SC}$ with a private key, transmitting the encrypted message and a challenge message from authentication server 402 to storage controller 404 with a new nonce $n_{AS}$ encrypted using the private key. In one or more embodiments, operation 506 may then involve decrypting the message from authentication server 402 at storage controller 404 using the public portion of the key generated during the transmission of nonce $n_{SC}$ therefrom.

In one or more embodiments, operation 508 may then involve checking as to whether nonce $n_{SC}$ transmitted from storage controller 404 matches with a content of the message received from authentication server 402. In one or more embodiments, the measurement list of authentication server 402 may also be checked to authenticate authentication server 402. In one or more embodiments, if there is a match of $n_{SC}$, operation 510 may then involve storage controller 404 replying with a measurement list thereof and nonce $n_{AS}$ received from authentication server 402 encrypted with the private key to authentication server 402 as a message.

In one or more embodiments, authentication server 402 may then be configured to decrypt the message from storage controller 404 using the public portion of the key(s) in operation 512. In one or more embodiments, operation 514 may involve checking as to whether nonce $n_{AS}$ first transmitted from authentication server 402 matches with a content of the message received from storage controller 404. In one or more embodiments, the measurement list of storage controller 404 may also be matched with a database at authentication server 402. In one or more embodiments, following a match of nonce $n_{AS}$ and the measurement list of storage controller 404, operation 516 may involve transmitting a message from authentication server 402 to storage controller 404 indicating that storage controller 404 is "trusted." In one or more embodiments, in case of failures associated with the nonce matches, an error message (e.g., "registration failure") may be generated.

Figure 6:
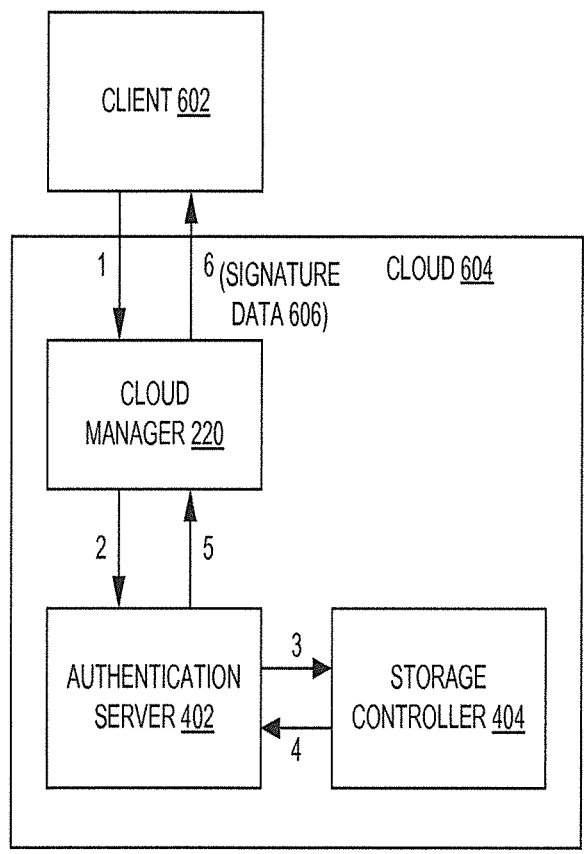
FIG. 6 is an illustrative view of the exchange of messages between a client device, a cloud manager, the authentication server of FIG. 4 and the storage controller of FIG. 4, according to one or more embodiments.

As discussed above, in one or more embodiments, when a client wants to verify the authenticity of storage controller 404, a series of messages may be exchanged between the client, authentication server 402 and storage controller 404. FIG. 6 illustrates the exchange of messages between client 602 (analogous to client 1 232 and client 2 234), cloud manager (e.g., cloud manager 220), authentication server 402 and storage controller 404. In one or more embodiments, cloud manager 220, authentication server 402 and storage controller 404 may be part of a cloud 604. As shown in FIG. 6, numbers 1-6 along the arrows between client 602, cloud manager 220, authentication server 402 and storage controller 404 may indicate a sequential order to data flow associated with cloud 604.

In one or more embodiments, client 602 may initiate an authentication request to cloud manager 220. In one or more embodiments, cloud manager 220 may then request authentication server 402 for purposes of attesting storage controller 404. In one or more embodiments, authentication server 402 may then transmit an authentication request to storage controller 404 with a nonce $n_{AS}$ (may/may not be the same as $n_{AS}$ discussed with regard to FIG. 5) and a measurement list thereof encrypted using the private key established during the registration process discussed with regard to FIG. 4 and FIG. 5. In one or more embodiments, storage controller 404 may then be configured to decrypt the message transmitted from authentication server 402 using the public portion of the key shared between authentication server 402 and storage controller 404 and to verify the measurement list of authentication server 402. In one or more embodiments, storage controller 404 may also transmit a measurement list thereof and the challenge message with the nonce $n_{AS}$ encrypted using the private key thereof.

In one or more embodiments, authentication server 402 may then be configured to decrypt the message from storage controller 404 using the public key shared therebetween. In one or more embodiments, if $n_{AS}$ matches with the challenge message previously transmitted from authentication server 402 and if the measurement list of storage controller 404 matches with the stored copy at authentication server 402, authentication server 402 may be configured to transmit a message to storage controller 404 indicating that storage controller 404 is "trusted," as discussed above.

In one or more embodiments, cloud manager 220 may then transmit the signature data (e.g., measurement list; shown as signature data 606 (obtained in sequence 6) in FIG. 6) of storage controller 404 to the client. In one or more embodiments, thus, the client may be able to verify the integrity of storage controller 404 (e.g., storage controller 202) configured to host one or more vserver(s) (e.g., vserver 1 206) associated with the client (e.g., client 1 232).

Figure 7:
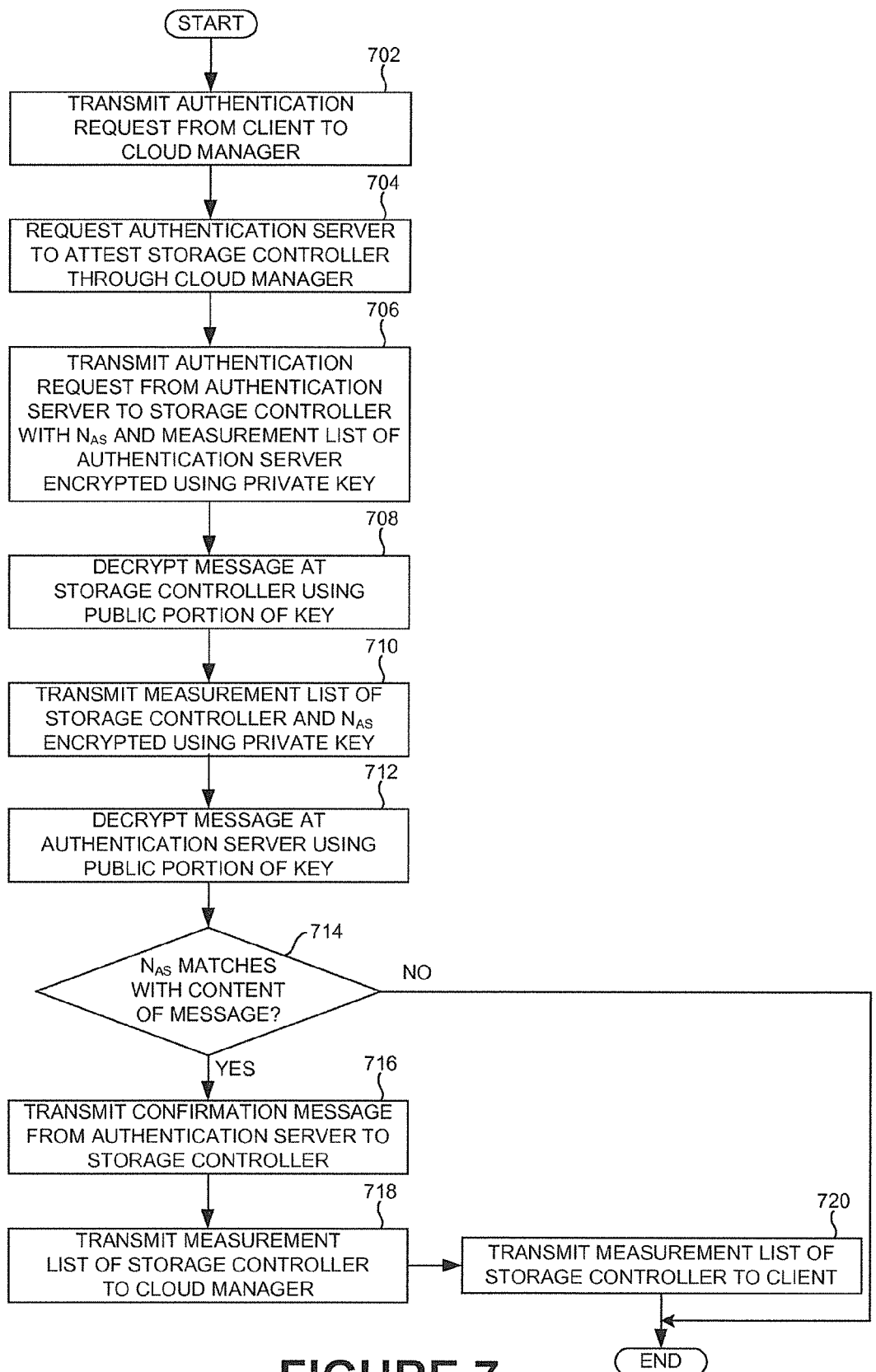
FIG. 7 is a flowchart detailing the operations involved in a method of the authenticity of the storage controller of FIG. 4 through a client device, according to one or more embodiments.

FIG. 7 summarizes the abovementioned authentication process, according to one or more embodiments. Specifically, FIG. 7 shows a flowchart detailing the operations involved in a method of verifying the authenticity of storage controller 404 through client 602, according to one or more embodiments. In one or more embodiments, operation 702 may involve transmitting an authentication request from client 602 to cloud manager 220. In one or more embodiments, operation 704 may then involve requesting, through cloud manager 220, authentication server 402 to attest storage controller 404. In one or more embodiments, operation 706 may then involve transmitting an authentication request from authentication server 402 to storage controller 404 with a nonce $n_{AS}$ and a measurement list of authentication server 402 encrypted using the private key established during the registration process discussed above.

In one or more embodiments, operation 708 may involve decryption of the message transmitted from authentication server 402 at storage controller 404 using the public portion of the key. In one or more embodiments, the measurement list of authentication server 402 may also be verified at storage controller 404. In one or more embodiments, operation 710 may then involve transmitting, from storage controller 404 to authentication server 402, the measurement list of storage controller 404, along with nonce $n_{AS}$ associated with the previous transmission from authentication server 402, encrypted using the private key thereof.

In one or more embodiments, operation 712 may involve decrypting the message from storage controller 404 at authentication server 402 using the public portion of the key. In one or more embodiments, operation 714 may involve verifying as to whether a content of the message matches with nonce $n_{AS}$ transmitted first from authentication server 402 to storage controller 404. In one or more embodiments, the measurement list of storage controller 404 may also be verified for a match with the stored copy at authentication server 402. In one or more embodiments, if both are matches, operation 716 may involve transmitting a message from authentication server 402 to storage controller 404 indicating that storage controller 404 is "trusted."

In one or more embodiments, operation 718 may then involve transmitting the measurement list of storage controller 404 from authentication server 402 to cloud manager 220. In one or more embodiments, operation 720 may involve transmitting the measurement list of storage controller 404 to client 602 (e.g., client 1 232). In one or more embodiments, if the abovementioned nonce match fails, an error message (e.g., "authentication failure") may be generated.

Figure 8:
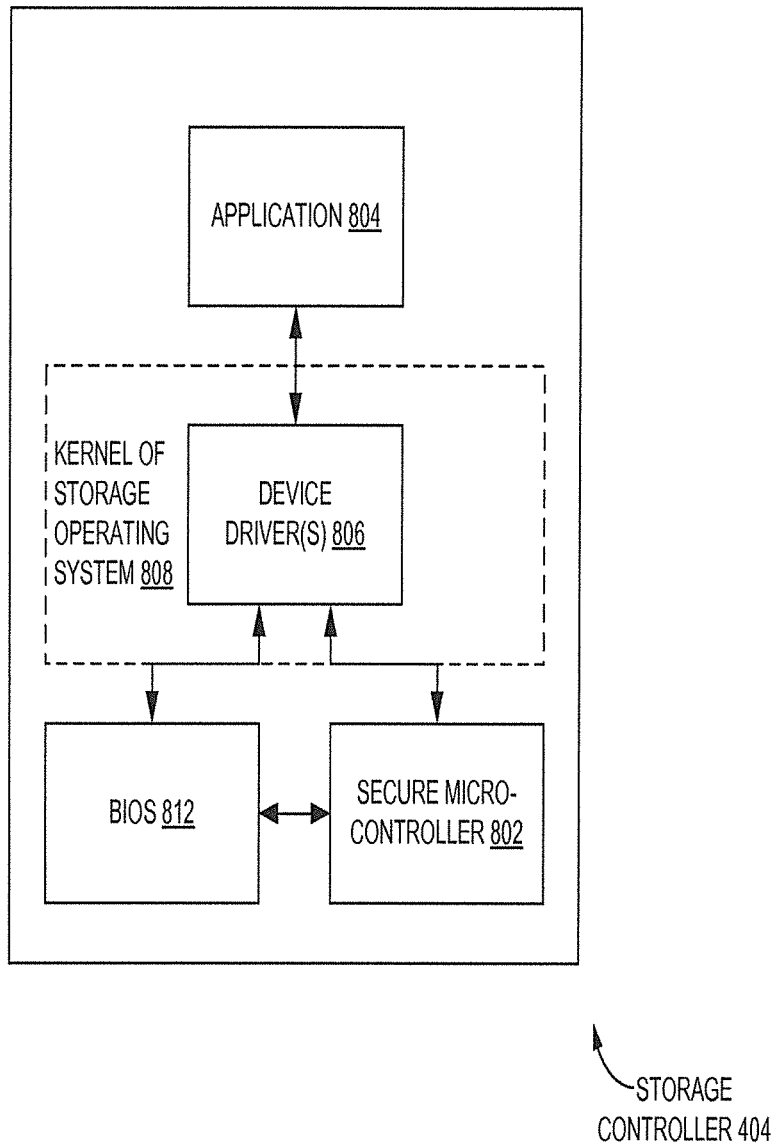
FIG. 8 is a schematic view of a secure microcontroller interfaced with the storage controller of FIG. 4, according to one or more embodiments.

FIG. 8 shows the secure microcontroller (e.g., secure microcontroller 802) discussed above interfaced with storage controller 404, according to one or more embodiments. In one or more embodiments, secure microcontroller 802 may be incorporated on a motherboard associated with storage controller 404. In one or more embodiments, the BIOS (e.g., BIOS 812) on storage controller 404 may be upgraded such that the BIOS is aware of the hardware associated with secure microcontroller 802. In one or more embodiments, applications 804 associated with storage controller 404 may be written such that applications 804 are secure microcontroller 802 aware. In one or more embodiments, a secure microcontroller aware application 804 may communicate with authentication server 402 for purposes of authentication and attestation, which are discussed above.

In one or more embodiments, secure microcontroller aware application 804 may also communicate with secure microcontroller 802 and BIOS 812 of storage controller 404 through device driver(s) 806 written therefor for purposes of storing and retrieving security data (e.g., keys, platform measurement list(s)). In one or more embodiments, device driver(s) 806 may be a part of the kernel associated with storage operating system 808 configured to execute on storage controller 404.

When one or more storage controller(s) are associated with a cloud, the exemplary embodiments discussed above may aid in a customer (e.g., client) of the cloud remotely verifying that the one or more storage controller(s) are "trustworthy." In one or more embodiments, the cloud customer may verify attributes of the one or more storage controller(s) such as the BIOS version, the operating system version and/or physical hardware identification attributes. In one or more embodiments, thus, customers seeking sensitivity/security of data may consider opting for cloud computing to meet storage requirements thereof.

In one or more embodiments, as discussed above, secure microcontroller 802 may be a TPM chip. Therefore, in one or more embodiments, cloud customers may utilize software configured to communicate with the servers having TPM modules associated therewith to fetch information associated with the hosts. As TPM modules have found wide technological use, already existing software may be remodeled quickly in order to verify authenticity of the one or more storage controller(s). Thus, the exemplary embodiments may provide for a consistent and secure cloud computing system, which may be completely TPM based.

It is obvious that the capability of the client(s) to query the one or more storage controllers(s) to obtain a measurement list is the same as the capability of the client(s) to query the vserver(s) associated with the one or more storage controller(s) to obtain the measurement list. Further, it is obvious that the measurement list of storage controller 404 may also be transmitted to a client device periodically without the client device querying storage controller 404.

Figure 9:
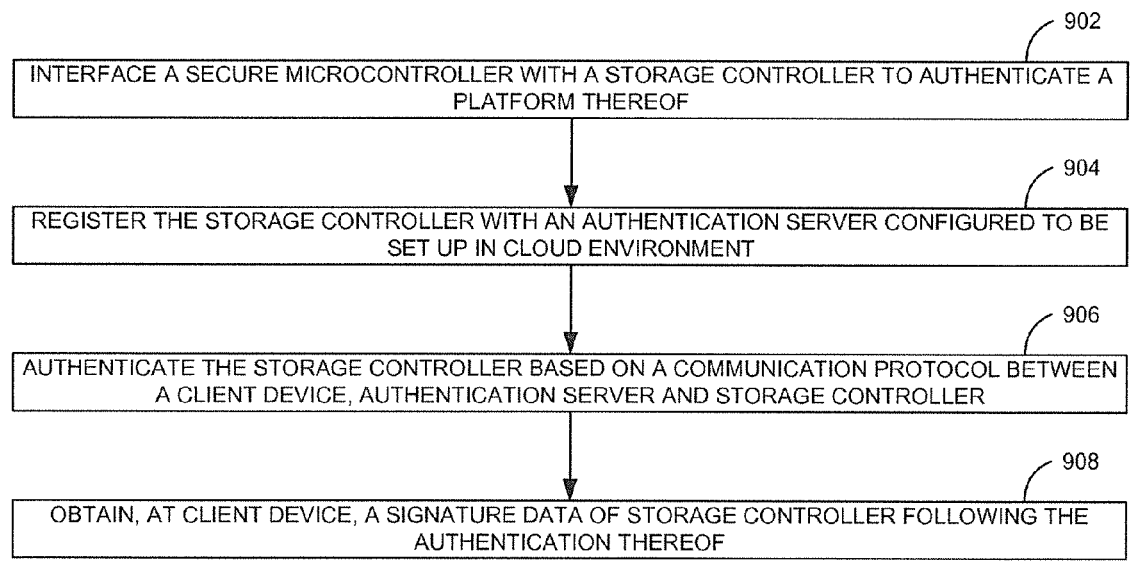
FIG. 9 is a process flow diagram detailing the operations involved in a method of improving storage security in a cloud environment, according to one or more embodiments.

FIG. 9 shows a process flow diagram detailing the operations involved in a method of improving storage security in cloud environment 200, according to one or more embodiments. In one or more embodiments, operation 902 may involve interfacing secure microcontroller 802 with storage controller 404 configured to host one or more virtual server(s) appropriately provisioned to a client device in cloud environment 200 to authenticate a platform associated with storage controller 404. In one or more embodiments, operation 904 may involve registering storage controller 404 with authentication server 402 configured to be set up in cloud environment 200.

In one or more embodiments, operation 906 may involve authenticating storage controller 404 based on a communication protocol between the client device, authentication server 402 and storage controller 404. In one or more embodiments, operation 908 may then involve obtaining, at the client device, a signature data (e.g., measurement list discussed above) of storage controller 404 following the authentication thereof. In one or more embodiments, the signature data is configured to be stored in secure microcontroller 802 interfaced with storage controller 404.

Figure 10:
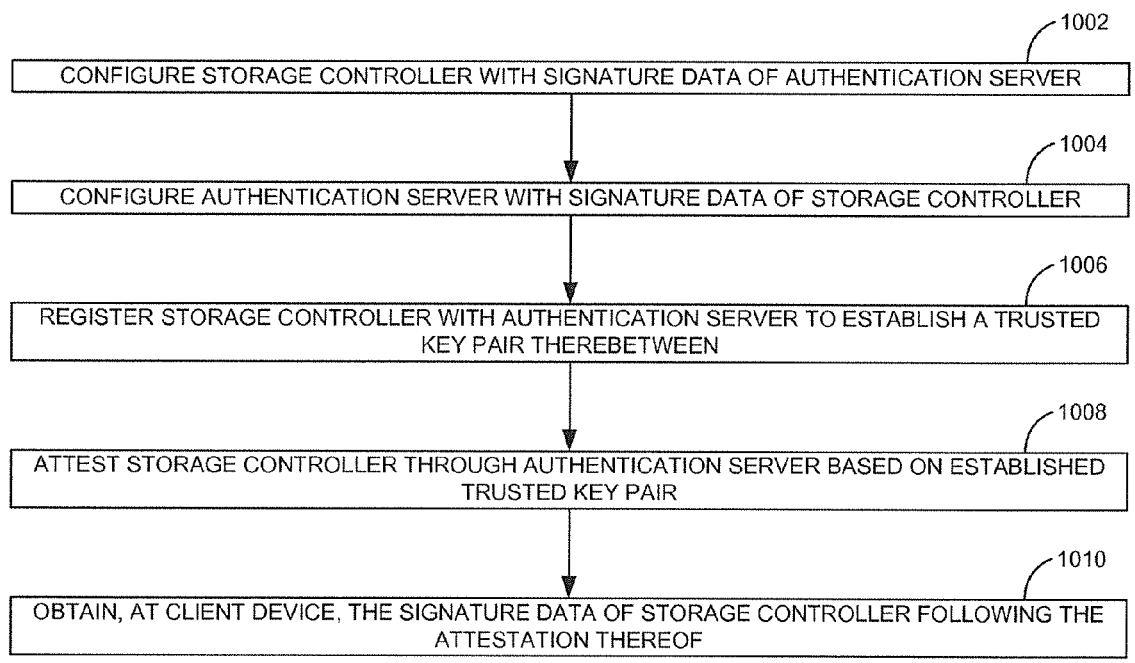
FIG. 10 is a process flow diagram detailing the operations involved in a method of verifying integrity of a storage controller configured to host one or more virtual server(s) appropriately provisioned to a client device in a cloud environment, according to one or more embodiments.

FIG. 10 shows a process flow diagram detailing the operations involved in a method of verifying integrity of storage controller 404 configured to host one or more virtual server(s) appropriately provisioned to a client device in cloud environment 200, according to one or more embodiments. In one or more embodiments, operation 1002 may involve configuring storage controller 404 with information associated with authentication server 402 set up in cloud environment 200. In one or more embodiments, the information may be associated with a signature data of the authentication server. In one or more embodiments, operation 1004 may involve configuring authentication server 402 with a signature data associated with storage controller 404.

In one or more embodiments, operation 1006 may involve registering storage controller 404 with authentication server 402 to establish a trusted key pair therebetween. In one or more embodiments, operation 1008 may involve attesting storage controller 404 through authentication server 402 based on the established trusted key pair. In one or more embodiments, operation 1010 may then involve obtaining, at the client device, the signature data of storage controller 404 following the attestation thereof.

Although the present embodiments have been described with reference to specific example embodiments, it will be evident that various modifications and changes may be made to these embodiments without departing from the broader spirit and scope of the various embodiments. Also, for example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Accordingly, the specification and drawings are to be regarded in an illustrative rather than a restrictive sense.

What is claimed is:

1. A method of improving storage security in a cloud environment comprising:
   interfacing a secure microcontroller with a storage controller associated with a client device in the cloud environment to authenticate a platform associated with the storage controller;
   registering the storage controller with an authentication server configured to be set up in the cloud environment;
   authenticating the storage controller based on a communication protocol between the client device, the authentication server and the storage controller; and
   obtaining, at the client device, a signature data of the storage controller following the authentication thereof, the signature data being configured to be stored in the secure microcontroller interfaced with the storage controller,
   wherein authenticating the storage controller includes:
   requesting the authentication server to attest the storage controller through a cloud manager of the cloud environment configured to provision storage therein;
   transmitting an authentication request from the authentication server to the storage controller with a nonce and the signature data of the authentication server encrypted using a private key;
   decrypting the encrypted nonce and the signature data of the authentication server at the storage controller using a public portion of a key shared between the authentication server and the storage controller;
   transmitting the signature data of the storage controller from the authentication server to the cloud manager when the signature data of the storage controller is matched in a database associated with the authentication server, and when the nonce is matched in decrypted content at the authentication server; and
   transmitting the signature data of the storage controller from the cloud manager to the client device.

2. The method of claim 1, wherein interfacing the secure microcontroller with the storage controller includes: incorporating the secure microcontroller on a motherboard associated with the storage controller; rendering a Basic Input/Output System (BIOS) on the storage controller to be aware of a hardware associated with the secure microcontroller; and communicating with the authentication server through an application configured to be aware of the hardware associated with the secure microcontroller during the registration and the authentication of the storage controller, the application being configured to communicate with the secure microcontroller and the BIOS on the storage controller through an appropriate device driver.

3. The method of claim 1, further comprising: configuring the storage controller with a signature data of the authentication server, the authentication server also being configured to be interfaced with a secure microcontroller configured to store the signature data thereof; and configuring the authentication server with the signature data of the storage controller prior to registering the storage controller with the authentication server.

4. The method of claim 1, wherein the secure microcontroller is a Trusted Platform Module (TPM) chip.

5. The method of claim 1, further comprising periodically transmitting, to the client device, the signature data of the storage controller following the authentication thereof.

6. The method of claim 2, wherein the signature data of the storage controller includes a list of hashes of at least one of a version of the BIOS on the storage controller, a storage operating system version executing on the storage controller, a physical hardware identification attribute of the storage controller and a configuration information associated with the storage controller.

7. The method of claim 1, wherein authenticating the storage controller based on the communication protocol between the client device, the authentication server and the storage controller further includes: transmitting, from the storage controller to the authentication server, the signature data of the storage controller and the nonce encrypted using the private key after verification of the signature data of the authentication server following the decryption; decrypting the encrypted signature data of the storage controller and the nonce at the authentication server using the public portion of the key shared between the authentication server and the storage controller.

8. The method of claim 7, further comprising: adding the storage controller to a list of trusted storage controllers associated with the authentication server following the authentication of the storage controller; and storing an appropriate key pair associated with the transmission between the authentication server and the storage controller at the authentication server.

9. The method of claim 8, further comprising: establishing a new key pair following rebooting of one of the storage controller and the authentication server; and registering the storage controller with the authentication server based on the new key pair.

10. A method of verifying integrity of a storage controller associated with a client device in a cloud environment comprising:
    configuring the storage controller with information associated with an authentication server set up in the cloud environment, the information being associated with a signature data of the authentication server;
    configuring the authentication server with a signature data associated with the storage controller; registering the storage controller with the authentication server to establish a trusted key pair therebetween;
    attesting the storage controller through the authentication server based on the established trusted key pair; and
    obtaining, at the client device, the signature data of the storage controller following the attestation thereof;
    wherein attesting the storage controller includes:
    requesting the authentication server to attest the storage controller through a cloud manager of the cloud environment configured to provision storage therein;
    transmitting an authentication request from the authentication server to the storage controller with a nonce and the signature data of the authentication server encrypted using a private key;
    decrypting the encrypted nonce and the signature data of the authentication server at the storage controller using a public portion of a key shared between the authentication server and the storage controller;
    transmitting the signature data of the storage controller from the authentication server to the cloud manager when the signature data of the storage controller is matched in a database associated with the authentication server, and when the nonce is matched in decrypted content at the authentication server; and
    transmitting the signature data of the storage controller from the cloud manager to the client device.

11. The method of claim 10, further comprising interfacing a secure microcontroller with the storage controller to authenticate a platform associated with the storage controller, wherein the signature data of the storage controller is configured to be stored in the secure microcontroller interfaced with the storage controller.

12. The method of claim 11, wherein interfacing the secure microcontroller with the storage controller includes: incorporating the secure microcontroller on a motherboard associated with the storage controller; rendering a BIOS on the storage controller to be aware of a hardware associated with the secure microcontroller; and communicating with the authentication server through an application configured to be aware of the hardware associated with the secure microcontroller during the registration and the attestation of the storage controller, the application being configured to communicate with the secure microcontroller and the BIOS on the storage controller through an appropriate device driver.

13. The method of claim 11, wherein the secure microcontroller is a TPM chip.

14. The method of claim 12, wherein the signature data of the storage controller includes a list of hashes of at least one of a version of the BIOS on the storage controller, a storage operating system version executing on the storage controller, a physical hardware identification attribute of the storage controller and a configuration information associated with the storage controller.

15. The method of claim 10, wherein attesting the storage controller further includes: transmitting, from the storage controller to the authentication server, the signature data of the storage controller and the nonce encrypted using the private key after verification of the signature data of the authentication server following the decryption; decrypting the encrypted signature data of the storage controller and the nonce at the authentication server using the public portion of the key shared between the authentication server and the storage controller.

16. The method of claim 15, further comprising: adding the storage controller to a list of trusted storage controllers associated with the authentication server following the attestation of the storage controller; and storing an appropriate key pair associated with the transmission between the authentication server and the storage controller at the authentication server.

17. The method of claim 16, further comprising: establishing a new trusted key pair following rebooting of one of the storage controller and the authentication server; and registering the storage controller with the authentication server based on the new key pair.

18. A cloud environment with improved storage security device;
a processor coupled to the storage device configured to execute programmed instructions stored in the storage device comprising:
a client device; a cloud manager configured to provision storage associated with the client device in the cloud environment; a storage controller associated with the client device, the storage controller comprising a secure microcontroller interfaced therewith to authenticate a platform associated therewith; and an authentication server configured to register the storage controller and to authenticate the storage controller based on a communication protocol between the client device, the storage controller and the authentication server, wherein the client device is at least one of: automatically configured to obtain a signature data of the storage controller following the authentication thereof, and configured to obtain the signature data of the storage controller following the authentication thereof upon querying the storage controller, wherein the secure microcontroller is configured to store the signature data of the storage controller therein and wherein during authentication of the storage controller based on the communication protocol, the cloud manager is configured to request the authentication server to attest the storage controller, the authentication server is further configured to transmit an authentication request to the storage controller with a nonce and the signature data of the authentication server encrypted using a private key, and the storage controller is further configured to decrypt the encrypted third nonce and the signature data of the authentication server using a public portion of the key shared between the authentication server and the storage controller; transmit the signature data of the storage controller from the authentication server to the cloud manager when the signature data of the storage controller is matched in a database associated with the authentication server, and when the nonce is matched in decrypted content at the authentication server; and transmit the signature data of the storage controller from the cloud manager to the client device.

19. The cloud environment of claim 18, wherein the secure microcontroller is incorporated on a motherboard associated with the storage controller, wherein a BIOS on the storage controller is configured to be aware of a hardware associated with the secure microcontroller, wherein the storage controller is configured to communicate with the authentication server through an application configured to be aware of the hardware associated with the secure microcontroller during the registration and the authentication of the storage controller, and wherein the application is configured to communicate with the secure microcontroller and the BIOS on the storage controller through an appropriate device driver.

20. The cloud environment of claim 18, wherein, prior to registering the storage controller with the authentication server: the storage controller is configured with a signature data of the authentication server, the authentication server also being configured to be interfaced with a secure microcontroller configured to store the signature data thereof, and the authentication server is configured with the signature data of the storage controller.

21. The cloud environment of claim 18, wherein the secure microcontroller is a TPM chip.

22. The cloud environment of claim 18, further comprising a computer network configured to enable communication between the client device and the cloud manager.

23. The cloud environment of claim 19, wherein the signature data of the storage controller includes a list of hashes of at least one of a version of the BIOS on the storage controller, a storage operating system version executing on the storage controller, a physical hardware identification attribute of the storage controller and a configuration information associated with the storage controller.

24. The cloud environment of claim 18, wherein during authentication of the storage controller based on the communication protocol, the storage controller is further configured to transmit, to the authentication server, the signature data thereof and the nonce encrypted using the private key after verification of the signature data of the authentication server following the decryption, the authentication server is further configured to decrypt the encrypted signature data of the storage controller and the nonce using the public portion of the key shared between the authentication server and the storage controller.

25. The cloud environment of claim 24, wherein: the authentication server is further configured to add the storage controller to a list of trusted storage controllers associated therewith following the authentication of the storage controller, and the authentication server is further configured to store an appropriate key pair associated with the transmission between the authentication server and the storage controller in a memory associated therewith.

26. The cloud environment of claim 25, wherein: a new key pair is established following rebooting of one of the storage controller and the authentication server, and the authentication server is configured to register the storage controller based on the new key pair.

\* \* \* \* \*